United States Patent Office 2,709,937
Patented June 7, 1955

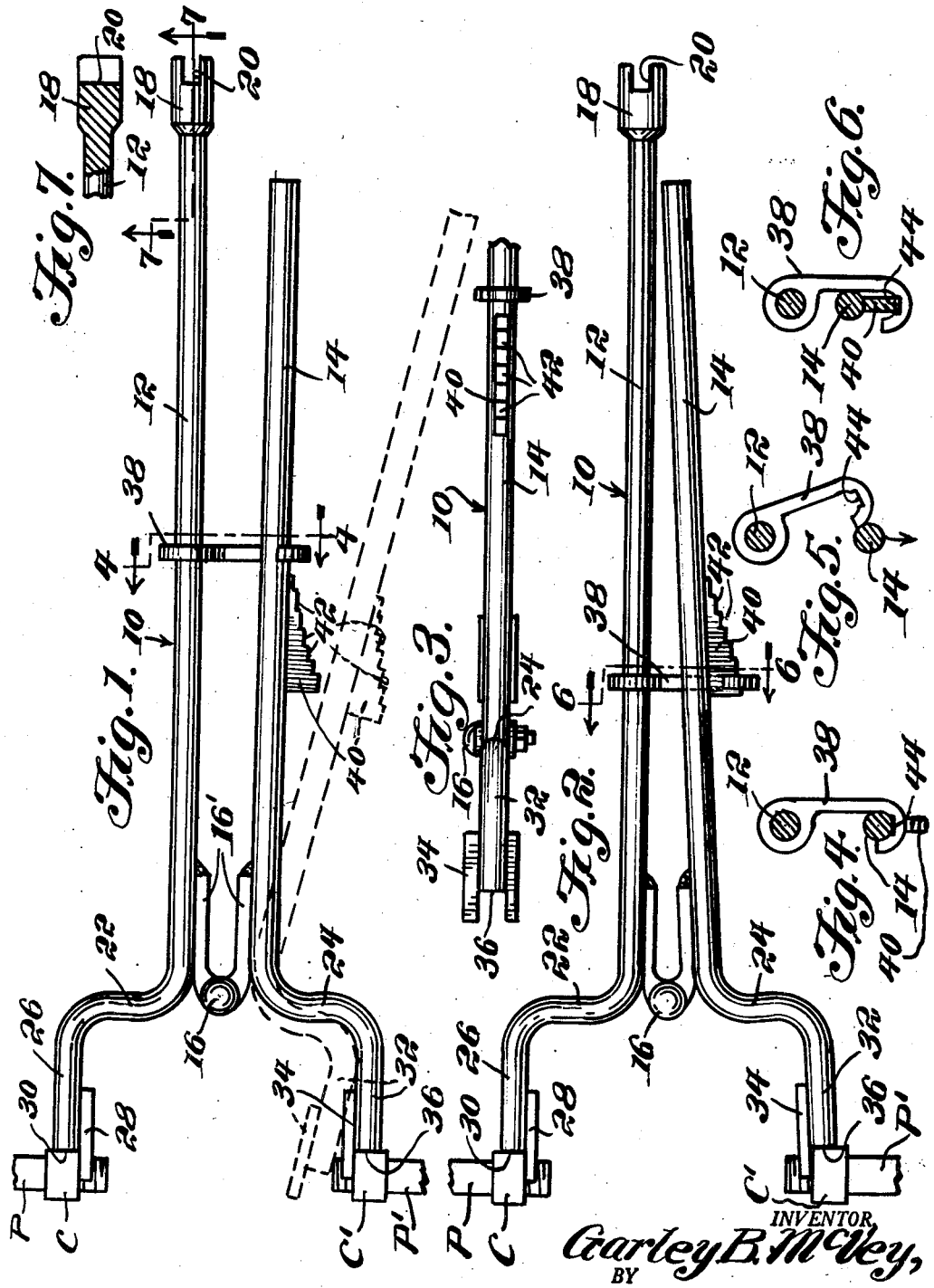

2,709,937

PIPE SPREADING AND HOLDING IMPLEMENT

Garley B. McVey, Baldwin, Miss.

Application April 2, 1954, Serial No. 420,507

3 Claims. (Cl. 81—5.1)

This invention relates to an improved pipe spreading and holding implement and has for its primary object to provide such an implement especially for maintaining the adjacent ends of two sections of a water service pipe spread during the substitution of one water meter for another.

Another object is to hold the pipe sections a selected distance apart without requiring the exercise of manual effort after the pipe sections have been once spread.

The above and other objects may be attained by employing this invention which embodies among its features handles pivotally connected together adjacent one end of the implement for movement about a common axis, arms carried by the handles and extending perpendicularly outwardly therefrom on opposite sides of the common axis for movement in arcuate paths on opposite sides of the common axis, legs carried by the arms and extending perpendicularly outwardly therefrom in a direction opposite the handles, and pipe engaging forks carried by the legs and extending longitudinally outwardly therefrom remote from the arms.

Other features include locating the forks on adjacent sides of the legs so that the portions thereof which project longitudinally from the legs define with the ends of the legs seats for receiving collars carried by the pipe sections to be spread, a hook carried by one of the handles for rotation thereabout and movement longitudinally therealong, and a stepped block carried by the opposite handle and extending laterally outwardly therefrom on the side thereof remote from the cooperating handle for engagement by the hook to hold the handles against outward movement and the forks against inward movement under the influence of pipes spread by the forks.

In the drawings:

Figure 1 is a side view in elevation of an implement embodying the features of this invention;

Figure 2 is a view similar to Figure 1, showing the implement spread and holding the adjacent ends of sections of a water service pipe expanded;

Figure 3 is a fragmentary edge view of the implement illustrated in Figure 1;

Figure 4 is a transverse sectional view taken substantially on the line 4—4 of Figure 1;

Figure 5 is a view showing the hook disengaged to permit the handles to be spread;

Figure 6 is a transverse sectional view taken substantially on the line 6—6 of Figure 2; and Figure 7 is a fragmentary sectional view taken substantially on the line 7—7 of Figure 1.

Referring to the drawings in detail, the illustrated implement designated generally 10 comprises preferably straight handles 12 and 14 which are pivotally connected together adjacent one end by a pivot 16 to move in arcuate paths on opposite sides of a common axis. The pivot traverses flanges 16' which project laterally from the facing sides of the handles and in line with the adjacent ends of the handles. Carried by the handle 12 adjacent the end thereof remote from the pivot 16 is a head 18 having a transverse slot 20 in its free end thereof to provide a wrench for engaging the key of a conventional subterranean water control valve.

Carried by the handle 12 and extending perpendicularly outwardly therefrom adjacent the common axis of the pivot 16 is an arm 22, and a similar arm 24 is carried by the handle 14, as will be readily understood upon reference to the drawings. A leg 26 is carried by the arm 22 remote from the handle 12 and extends perpendicularly outwardly from the arm in the opposite direction of the handle 12, and carried by the inner side of the leg 26 adjacent the end thereof remote from the arm 22 is a fork 28 having a notch opening through the end thereof for the reception of the threaded end of a water supply pipe P which carries a collar C against which the fork 28 abuts. It is to be noted that the fork 28 projects beyond the end of the leg 26 to define a seat 30 in which the collar C is received.

Extending perpendicularly from the arm 24 adjacent the end thereof remote from the handle 14 is a leg 32 which extends longitudinally outwardly in a direction opposite the handle 14 and carries adjacent its outer end a fork 34 which lies adjacent the inner side of the leg 32 and projects longitudinally beyond the end of the leg to define a seat 36 in which is received the collar C' of the water supply pipe P' which normally aligns with the pipe P, as will be readily understood upon reference to the drawings. It will thus be seen that when the handles 12 and 14 are moved toward one another, the forks 28 and 34 will be moved outwardly, so as to expand the distance between the adjacent ends of the pipes P and P' to facilitate the removal of a meter from its normal position therebetween.

In order to maintain the pipes P and P' expanded, a hook 38 is mounted on the handle 12 to rotate thereabout and also to move longitudinally therealong, and carried by the handle 14 and extending outwardly therefrom on the side thereof remote from the handle 12 is a block 40 having steps 42 which are adapted to be engaged by the hook 38 to hold the handles a selected distance apart and prevent their approach toward one another under the influence of the effort of the pipes P and P' to advance toward one another.

In the preferred form of the invention, the hook 38 is provided with a substantially rectangular recess 44 which defines a seat for engagement by a selected step 42 of the block 40.

In use, it will be evident that having cut off the water supply through the meter (not shown), the pipes P and P' may be disconnected therefrom and as such disconnection takes place, the forks 28 and 34 are engaged with the respective collars C and C' so that as the handles 12 and 14 are advanced toward one another, the pipes P and P' will be spread so that the meter may be removed from its position therebetween. By engaging the hook 38 with a selected step 42, it is evident that the implement may be locked in a selected position to hold the pipes P and P' a selected distance apart until such time as the meter is replaced and threadedly coupled to the adjacent ends of the pipe after which the implement may be released by disengaging the hook 38 from the block 40 and permitting the handles 12 and 14 to spread so as to contract the extreme outer ends of the legs 26 and 32.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a pipe spreading and holding implement, a pair of straight handles having outer and inner ends, arms on the inner ends of the handles, said arms projecting laterally from the handles in opposite directions, said arms having outer ends terminating in legs extending parallel to the handles and projecting longitudinally beyond the inner ends of the handles, means pivotally connecting the handles together at their inner ends, said legs having free ends, and pipe engaging forks on and projecting longitudinally beyond the free ends of the legs.

2. In a pipe spreading and holding implement, a pair of straight handles having outer and inner ends, arms on the inner ends of the handles, said arms projecting laterally from the handles in opposite directions, said arms having outer ends terminating in legs extending parallel to the handles and projecting longitudinally beyond the inner ends of the handles, means pivotally connecting the handles together at their inner ends, said legs having free ends, and pipe engaging forks on and projecting longitudinally beyond the free ends of the legs, said forks comprising blocks fixed on the facing sides of the legs, said blocks having free ends provided with pipe receiving notches.

3. In a pipe spreading and holding implement, a pair of straight handles having outer and inner ends, arms on the inner ends of the handles, said arms projecting laterally from the handles in opposite directions, said arms having outer ends terminating in legs extending parallel to the handles and projecting longitudinally beyond the inner ends of the handles, means pivotally connecting the handles together at their inner ends, said legs having free ends, and pipe engaging forks on and projecting longitudinally beyond the free ends of the legs, said forks comprising blocks fixed on the facing sides of the legs, said blocks having free ends provided with pipe receiving notches, and means for maintaining the handles in closed relation to each other comprising a block fixed to and extending along one handle at the side thereof remote from the other handle, said block having an edge flaring toward the inner end of the handle and provided with steps, and an element having a first end pivotally mounted on said other handle to swing on the axis of said other handle and to slide along said other handle, said element having a second end having a hook thereon engageable around said one handle and movable along the edge of the block into engagement with a selected one of the steps.

References Cited in the file of this patent

UNITED STATES PATENTS

| | | |
|---|---|---|
| 64,904 | Perry | May 21, 1867 |
| 717,526 | Barney | Jan. 6, 1903 |
| 1,074,058 | Maxwell | Sept. 23, 1913 |
| 1,696,991 | Weber | Jan. 1, 1929 |
| 2,373,478 | Kuhn | Apr. 10, 1945 |

FOREIGN PATENTS

| | | |
|---|---|---|
| 26,507 | Great Britain | Nov. 18, 1912 |